(12) United States Patent
Yamada (10) Patent No.: US 8,451,485 B2
(45) Date of Patent: May 28, 2013

(54) DEVICE, METHOD AND COMPUTER READABLE MEDIUM FOR DATA WRITING

(75) Inventor: Akihiro Yamada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1246 days.

(21) Appl. No.: 12/239,069

(22) Filed: Sep. 26, 2008

(65) Prior Publication Data

US 2009/0086284 A1 Apr. 2, 2009

(30) Foreign Application Priority Data

Sep. 27, 2007 (JP) ................................. 2007-251689

(51) Int. Cl.
*G06K 15/00* (2006.01)

(52) U.S. Cl.
USPC ......................................................... 358/1.16

(58) Field of Classification Search
None
See application file for complete search history.

(56) References Cited

U.S. PATENT DOCUMENTS

| 2003/0072033 A1* | 4/2003 | Kanda ........................... 358/1.16 |
| 2004/0010668 A1* | 1/2004 | Inagaki et al. ................. 711/162 |
| 2006/0055968 A1 | 3/2006 | Sato et al. |
| 2007/0013562 A1 | 1/2007 | Nagasawa |
| 2007/0091367 A1* | 4/2007 | Park et al. ..................... 358/1.16 |

FOREIGN PATENT DOCUMENTS

| JP | 63-177267 | | 7/1988 |
| JP | 11-331702 | | 11/1999 |
| JP | 2000215585 | A | 8/2000 |
| JP | 2003-153172 | | 5/2003 |
| JP | 2003-298819 | | 10/2003 |
| JP | 2003298819 | A * | 10/2003 |
| JP | 2006-067560 | | 3/2006 |
| JP | 2006-215594 | | 8/2006 |
| JP | 2006-287869 | | 10/2006 |
| JP | 2006287869 | A * | 10/2006 |
| JP | 2007-028179 | | 2/2007 |

OTHER PUBLICATIONS

Decision of Rejection for Japanese Patent Application 2007-251689 mailed on Dec. 8, 2009.
Notification of Reasons of Rejection for Japanese Application No. 2007-251689 mailed on Sep. 29, 2009.
Questioning for Japanese Appeal Case No. 2010-4885, Patent Application No. 2007-251689, mailed Nov. 9, 2010.

* cited by examiner

*Primary Examiner* — Marivelisse Santiago Cordero
*Assistant Examiner* — Mesfin Getaneh
(74) *Attorney, Agent, or Firm* — Banner & Witcoff, Ltd.

(57) ABSTRACT

There is provided a data writing device, comprising: a plurality of connection slots to which a plurality of external storage devices are detachably attachable; an acceptance unit configured to accept a writing command inputted to the data writing device through a user operation; and a write control unit configured to write data to a plurality of external storage devices attached to the plurality of connection slots in response to acceptance of the writing command by the acceptance unit.

17 Claims, 6 Drawing Sheets

| EXTERNAL MEMORY DEVICE #1 | EXTERNAL MEMORY DEVICE #2 | EXTERNAL MEMORY DEVICE #3 |
| LOW_DENSITY.JPG | NORMAL_DENSITY.JPG | HIGH_DENSITY.JPG |

FIG.10

DEVICE, METHOD AND COMPUTER READABLE MEDIUM FOR DATA WRITING

CROSS-REFERENCE TO RELATED APPLICATION

This application claims priority under 35 U.S.C. §119 from Japanese Patent Application No. 2007-251689, filed on Sep. 27, 2007. The entire subject matter of the application is incorporated herein by reference.

BACKGROUND

1. Technical Field

Aspects of the present invention relate to a data writing device (e.g., an image forming device) having a function of writing data to external memory devices.

2. Related Art

Image forming devices having a function of scanning a document and writing data read from the document to an external memory device have been widely used. Japanese Patent Provisional Publication No. 2007-028179 (hereafter, referred to as JP2007-028179A) discloses an example of such an image forming device. The image forming device is configured to allow a user to input a writing command for wiring data to an external memory.

SUMMARY

However, regarding a user operation on the image forming device disclosed in JP2007-028179A, the user is required to input a wiring command into the image forming device for each of external memory devices attached to the image forming device. More specifically, in order to write same data to a plurality of external memory devices, the user is required to repeat an input operation for inputting a writing command by a plurality of times corresponding to the number of external memory devices to which the user want to write the data.

Aspects of the present invention are advantageous in that at least a data writing device capable of writing data to a plurality of memory device attached thereto while enhancing usability of inputting a writing command.

According to an aspect of the invention, there is provided a data writing device, comprising: a plurality of connection slots to which a plurality of external storage devices are detachably attachable; an acceptance unit configured to accept a writing command inputted to the data writing device through a user operation; and a write control unit configured to write data to a plurality of external storage devices attached to the plurality of connection slots in response to acceptance of the writing command by the acceptance unit.

Since a writing operation for writing data to a plurality of external storage devices are executed once a writing command is inputted to the data writing device, it becomes unnecessary to repeated input the writing command by a plurality of time corresponding to the number of external storage devices connected to the plurality of connection slots. Consequently, usability of the data writing device is enhanced in regard to the writing operation.

According to another aspect of the invention, there is provided a computer readable medium having computer readable instruction stored thereon, which, when executed by a processor of a data writing device having a plurality of connection slots to which a plurality of external storage devices are detachably attachable, configures the processor to perform the steps of: accepting a writing command inputted to the data writing device through a user operation; and writing data to a plurality of external storage devices attached to the plurality of connection slots in response to acceptance of the writing command.

Since a writing operation for writing data to a plurality of external storage devices are executed once a writing command is inputted to the data writing device, it becomes unnecessary to repeated input the writing command by a plurality of time corresponding to the number of external storage devices connected to the plurality of connection slots. Consequently, usability of the data writing device is enhanced in regard to the writing operation.

According to another aspect of the invention, there is provided a method to be implemented on a data writing device having a plurality of connection slots to which a plurality of external storage devices are detachably connectable, the method comprising the steps of: accepting a writing command inputted to the data writing device through a user operation; and writing data to a plurality of external storage devices attached to the plurality of connection slots in response to acceptance of the writing command.

Since a writing operation for writing data to a plurality of external storage devices are executed once a writing command is inputted to the data writing device, it becomes unnecessary to repeated input the writing command by a plurality of time corresponding to the number of external storage devices connected to the plurality of connection slots. Consequently, usability of the data writing device is enhanced in regard to the writing operation.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

DETAILED DESCRIPTION

Hereafter, an embodiment according to the invention will be described with reference to the accompanying drawings.

Figure 1:
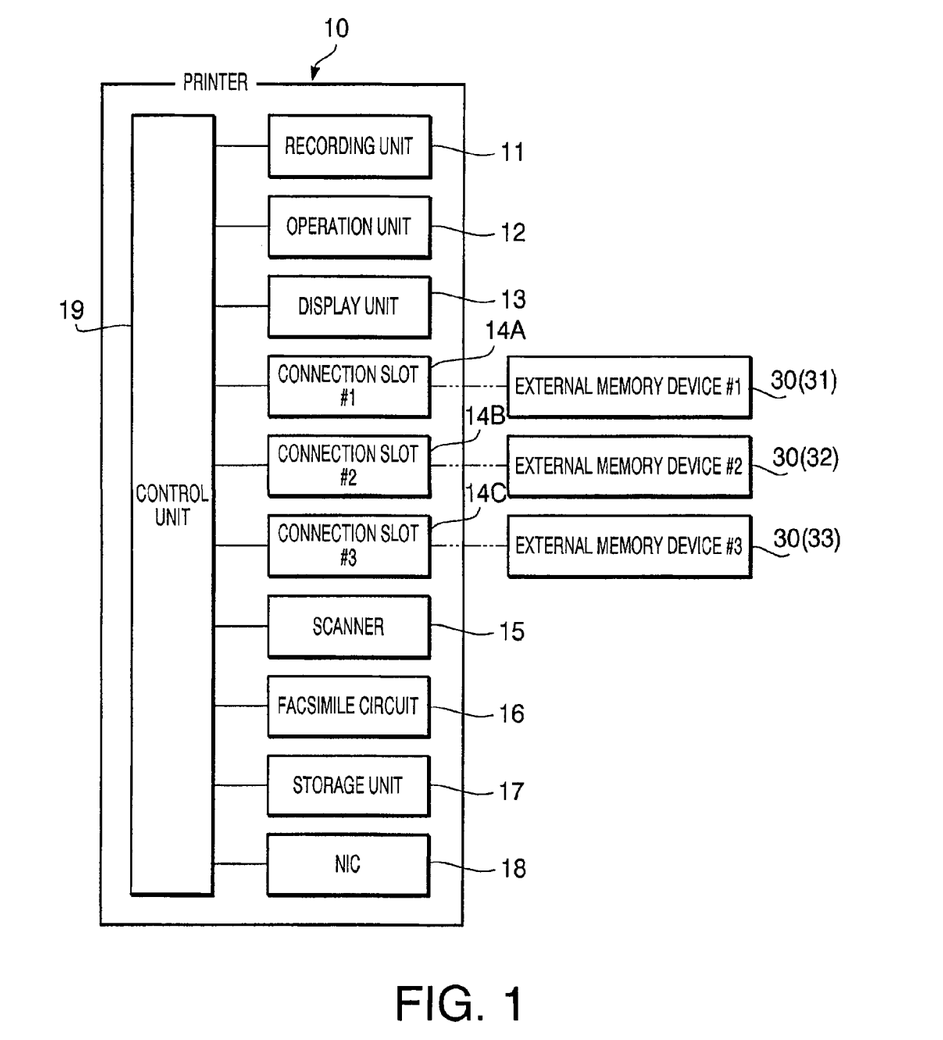
FIG. 1 is a block diagram of an MFP (multifunction peripheral) functioning as a data writing device according to an embodiment.

FIG. 1 is a block diagram of an MFP (multifunction peripheral) 10 functioning as a data writing device according to an embodiment.

As shown in FIG. 1, the MFP 10 includes a recording unit 11 having a function of forming an image on a recording sheet, an operation panel 12 used by a user to operate the MFP 10, a display unit 13 on which various types of information is displayed, connection slots 14A to 14C to which external memory devices are detachably attachable, a scanner 15 which reads information from a document and creates image data in accordance with the read information, a facsimile circuit 16, a storage unit 17, an NIC (Network Interface Card) 18, and a control unit 19 which controls these internal components connected to the control unit 19.

The display unit 13 is provided with a touch panel to detect whether the user touches a screen of the display unit 13 and to detect a position at which the user touches the screen of the display unit 13. That is, the display unit 13 has a touch panel function. Through the touch panel of the display unit 13, the control unit 19 is able to accept a user command.

Figure 5:
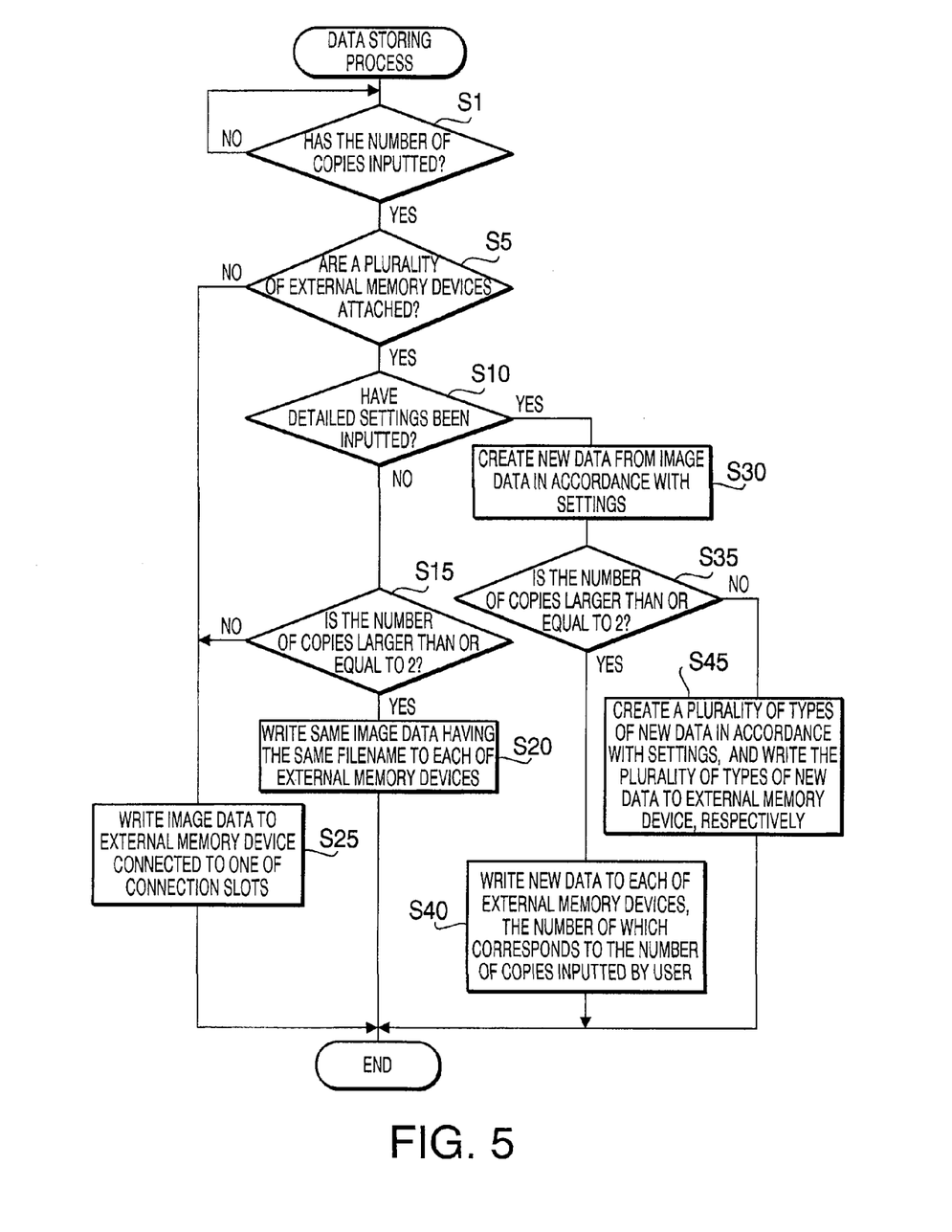
FIG. 5 is a flowchart illustrating a data storage process executed by the MFP.

The control unit 19 is, for example, a microcomputer chip in which a CPU, a ROM and a RAM are embedded. Various types of programs including a program shown in FIG. 5 are stored in the ROM of the control unit 19.

In this embodiment, the connection slots 14A-14C are configured as USB interfaces. To the connection slots 14A-14C, external memory devices 31-33 (#1-#3) are detachably attachable. In this embodiment, the external memory devices 31-33 are USB memories. It is noted that various types of interfaces complying with different technical standards may be employed as interfaces for the connection slots 14A-14C. Therefore, the connection slots 14A-14C may be configured such that external memory devices, such as a flash memory card, SD memory®, a removable HDD, and a digital camera supporting a technical standard "Pictbridge" for direct printing can be connected thereto. In the following, frequently, each of the external memory devices 31-33 is generically expressed as an external memory device 30 for convenience of explanation.

The MFP 10 has a function of directly printing print files stored in the external memory device 30 without the need of control by an external computer connected to the MFP 10. Hereafter, such a function is referred to as a direct print function.

The term "print file" as used herein means a data file having a predetermined format, such as a PDL (Page Description Language), which the MFP 10 is able to handle. The MFP 10 is also able to execute the direct printing function for an image file, such as a BMP file and a JPEG file.

As described in detail below, the MFP 10 is configured such that when the MFP 10 accepts, through the operation panel 12, a writing command for writing data to the external memory devices 30 attached to the connection slots 14A-14C, the MFP 10 writes data to a plurality of external memory devices 30. That is, once the MFP 10 accepts a writing command inputted by the user, the MFP 10 writes data to a plurality of external memory devices 30 attached to the connection slots 14A-14C.

Figure 2:
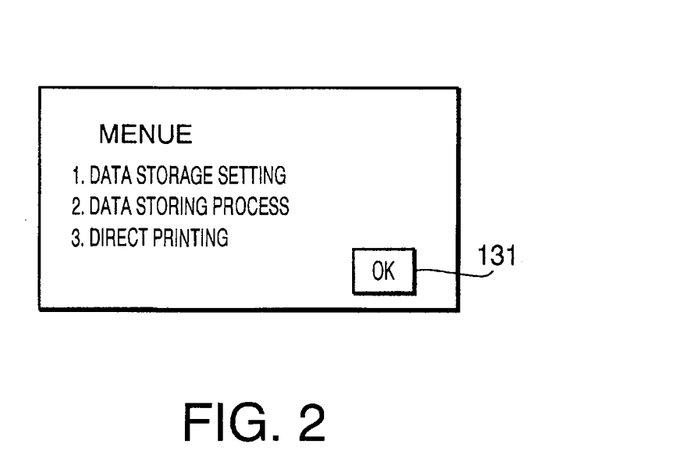
FIG. 2 illustrates an example of a menu screen displayed on a display unit of the MFP to allow a user to select a function to be executed on the MFP.

Hereafter, operations of the MFP 10 are explained. In the following, it is assumed that image data read by the scanner 15 is written into the external memory device 30. FIG. 2 illustrates a menu screen displayed on the display unit 13 of the MFP 10 to allow the user to select a function to be executed on the MFP 10.

In the menu screen shown in FIG. 2, menu items of "DATA STORAGE SETTING", "DATA STORING PROCESS" and "DIRECT PRINTING" are included. Through the menu screen shown in FIG. 12, the user is able to choose a function which the user wants to execute.

The item "DATA STORAGE SETTING" means a process where the user inputs settings, according to which the MFP 10 creates new data from original data to write the new data to a plurality of external memory devices 30. The item "DATA STORING PROCESS" means a process where the new data is stored into the plurality of external memory devices 30 in accordance with the settings set by the user.

When an OK button 131 is pressed by the user in the state where the item "DATA STORAGE SETTING" is selected, the menu screen shown in FIG. 2 is removed and then a setting menu screen shown in FIG. 13 is displayed on the display unit 13.

Figure 3:
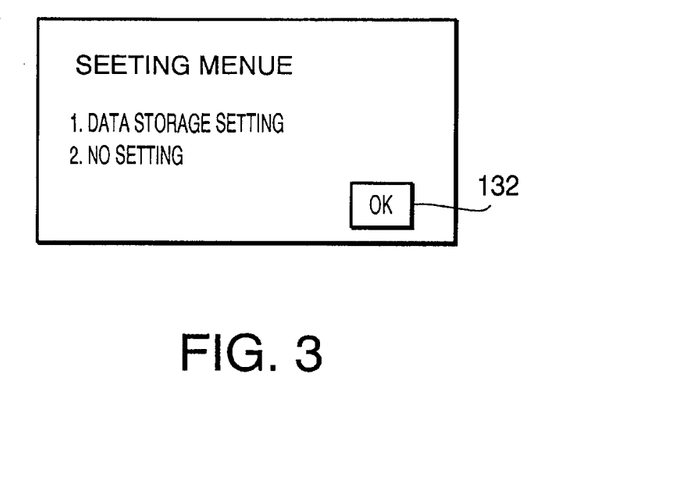
FIG. 3 illustrates an example of a menu screen to be displayed when a user selects a menu item of "DATA STORAGE SETTING" on the menu screen shown in FIG. 2.
Figure 4:
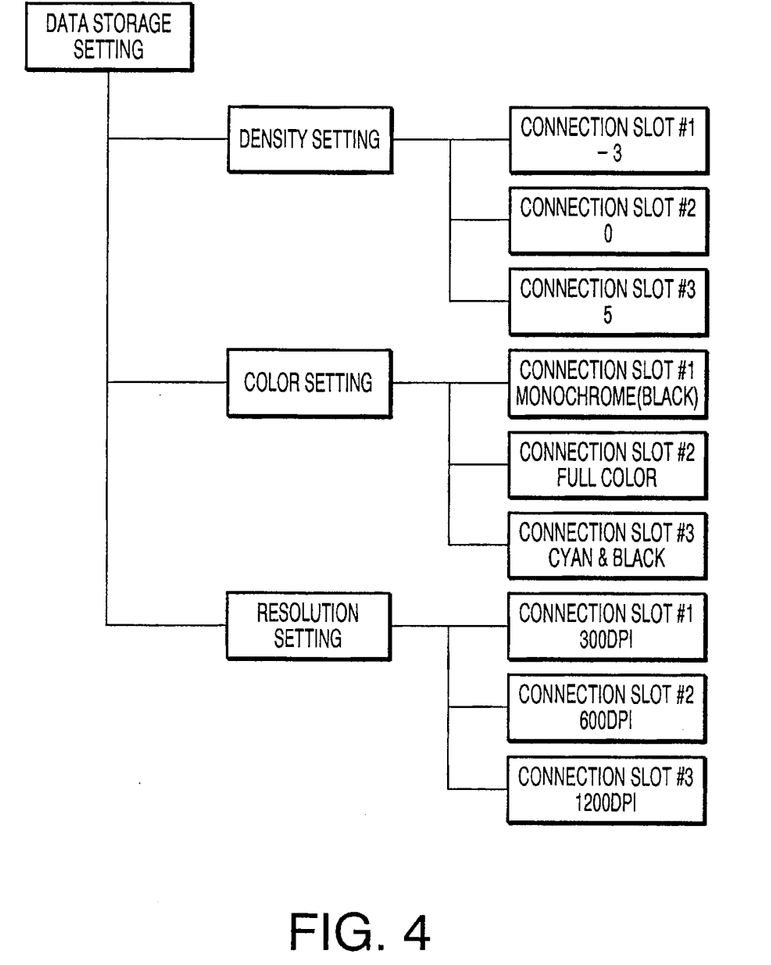
FIG. 4 illustrates a hierarchical setting menu structure representing settable items regarding "DATA STORAGE SETTING".

When an OK button 132 is pressed by the user in the state where the "DATA STORAGE SETTING" is selected in the setting menu screen shown in FIG. 3, detailed setting screens are displayed in accordance with a hierarchical setting menu structure shown in FIG. 4. More specifically, when the OK button 132 is selected in the state where the "DATA STORAGE SETTING" is selected, a setting screen including menu items of "DENSITY SETTING", "COLOR SETTING" and "RESOLUTION SETTING" is displayed on the display unit 13 of the MFP 10.

When the OK button 132 is pressed by the user in the state where one of the setting items of "DENSITY SETTING", "COLOR SETTING" and "RESOLUTION SETTING" is selected, a detailed setting screen for the selected item for inputting detailed settings for each of the connection slots 14A, 14B and 14C is displayed on the display unit 13.

Regarding the setting item of "DENSITY SETTING", the user is allowed to set the density of an image to be created as new data, for each of the connection slots 14A, 14B and 14C. For example, the user is able to set the density level of −3 for the connection slot 14A (connection slot #1), set the density level of 0 for the connection slot 14B (connection slot #2), and set the density level of 5 for the connection slot 14C (connection slot #3) as illustrated in FIG. 4. In this example, the "−" sign of the density level means the density is lower than a reference density level of "0", and the "+" sign of the density level means the density is higher than the reference density level of "0".

Regarding the setting item of "COLOR SETTING", the user is allowed to set the color setting of an image to be created as new data, for each of the connection slots 14A, 14B and 14C. For example, the user is able to set the color setting of "monochrome color" for the connection slot 14A (connection slot #1), set the color setting of "full color" for the connection slot 14B (connection slot #2), and set the color setting of "cyan and black" for the connection slot 14C (connection slot #3) as illustrated in FIG. 4.

Regarding the setting item of "RESOLUTION SETTING", the user is allowed to set the resolution of an image to be created as new data, for each of the connection slots 14A, 14B and 14C. For example, the user is able to set the resolution of 300 dpi for the connection slot 14A (connection slot #1), set the resolution of 600 dpi for the connection slot 14B (connection slot #2), and set the resolution of 1200 dpi for the connection slot 14C (connection slot #3) as illustrated in FIG. 4.

Although all of the setting items are assigned setting values in the example shown in FIG. 4, the MFP 10 may be configured to allow the user to set only one of the setting items of "DENSITY SETTING", "COLOR SETTING" and "RESOLUTION SETTING" so as not to allow the user to set more than one of the setting items of "DENSITY SETTING", "COLOR SETTING" and "RESOLUTION SETTING" at the same time. The reason is that typically it is not required to create new data in accordance with more than one of the setting items "DENSITY SETTING", "COLOR SETTING" and "RESOLUTION SETTING".

When the OK button 132 is pressed by the user in the state where the detailed settings have been inputted to the MFP 10 for each of the connections slots 14A, 14B and 14C, the inputted detailed settings are stored in the storage unit 17.

When the OK button 132 is pressed by the user in the state where the menu item "NO SETTING" is selected on the menu screen shown in FIG. 3, the detailed settings which have been set for each of the connection slots 14A, 14B and 14C are cancelled, and the MFP 10 moves to a state of not creating new data from original data.

When the OK button 131 is pressed by the user in the state where "DATA STORING PROCESS" is selected on the menu screen shown in FIG. 2, a data storage process shown in FIG. 5 is started. Hereafter, the data storage process is explained with reference to FIG. 5. The data storage process is executed under control of the control unit 19 of the MFP 10.

First, the control unit 19 judges whether the setting of the number of copies has been inputted by the user (step S1). The control unit 19 waits until the number of copies is set by the user (S1: NO). The user is able to set the number of copies by operating ten-keys provided on the operation panel 12 of the MFP 10.

If the number of copies is set (S1: YES), the control unit 19 judges whether more than one external memory devices have been connected to the MFP 10 (step S5). If more than one external memory devices have been connected to the MFP 10 (S5: YES), control proceeds to step S11 where the control unit 19 judges whether detailed settings have been inputted (i.e., whether the detailed settings have been inputted for at least one of the setting items, for each of the connection slots 14A, 14B and 14C).

If the control unit 19 judges that the detailed settings have not been set (S10: NO), control proceeds to step S15 where the control unit 19 judges whether the number of copies is larger than or equal to two (step S15). If the number of copies is larger than or equal to two (S15: YES), control proceeds to step S20 where the control unit 19 writes the image data obtained by the scanner 15 to each of the external memory devices, the number of which corresponds to the number of copies inputted by the user (step S20). That is, the control unit 19 writes the same image data having the same filename to each of the external memory devices, the number of which corresponds to the number of copies inputted by the user. Then, the data storage process terminates.

If it is judged in step S15 that the number of copies is smaller than two (i.e., the number of copies is one) (S15: NO) or it is judged in step S5 that only one external memory device is connected to the MFP 10 (S5: NO), the image data obtained by the scanner is written to the external memory device 30 connected to one of the connection slots 14A-14C (step S25). For example, in step S25, the image data is written to the external memory device connected to the connection slot #1. Then, the data storage process terminates. Examples of data files created in steps S20 and S25 are explained in detailed later.

If it is judged in step S10 that the detailed settings have been set (S10: YES), new data is created from the image data obtained by the scanner 15 (i.e., original data) in accordance with the settings (step S30). Then, the control unit 19 judges whether the number of copies is larger than or equal to two (step S35).

If the number of copies is larger than or equal to two (S35: YES), control proceeds to step S40 where the control unit 19 writes the new data to each of the external memory devices, the number of which corresponds to the number of copies inputted by the user(step S40). That is, the control unit 19 writes the same new data to each of the external memory devices, the number of which corresponds to the number of copies inputted by the user. Then, the data storage process terminates.

If the number of copies is not larger than or equal to two (S35: NO), control proceeds to step S45 where the control unit 19 creates new data from the original data (i.e., converts the image data obtained by the scanner 15 into new data) in accordance with the detailed settings. For example, in step S45, the control unit 19 creates a plurality of types of new data to be provided respectively for the connection slots 14A, 14B and 14C in accordance with the plurality of types of detailed settings defined respectively for the connection slots 14A, 14B and 14C as illustrated, for example, in FIG. 4. Then, the control unit 19 writes the plurality of types of new data to the connection slots #1-#3 (i.e., the external memory devices 31-33), respectively. Examples of data files created in steps S40 and S45 are explained in detailed later.

Figure 6:
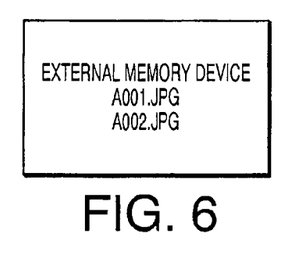
FIG. 6 is an explanatory illustration for explaining a first example of a result of the data storage process.

FIG. 6 is an explanatory illustration for explaining a result of the writing operation in step S25. More specifically, FIG. 6 shows the case where the data storage process is executed for two pieces of image data obtained by the scanner 15 ("A001.jpg" and "A002.jpg" stored in the RAM of the control unit 19). If the control unit 19 judges that only one external memory device is connected to the MFP 10 or the number of copies is set for one in the data storage process executed for each of image data files of "A001.jpg" and "A002.jpg", these image files are written to one external memory device connected to one of the connection slots 14A, 14B and 14C.

Figure 7:
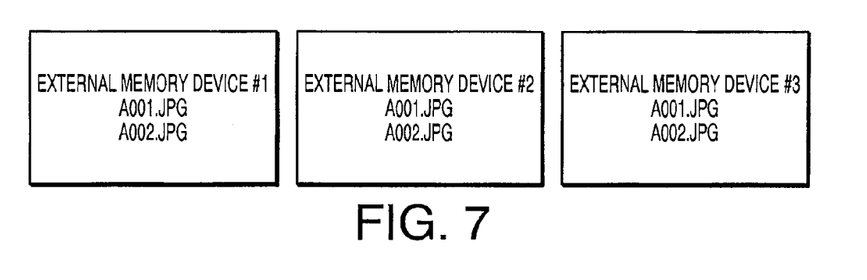
FIG. 7 is an explanatory illustration for explaining a second example of a result of the data storage process.

FIG. 7 is an explanatory illustration for explaining a result of the writing operation in step S20. More specifically, FIG. 7 shows the case where the data storage process is executed for two pieces of image data obtained by the scanner 15 ("A001.jpg" and "A002.jpg" stored in the RAM of the control unit 19). If the number of copies is three and three external memory devices are respectively connected to the connection slots 14A-14C in the data storage process executed for each of image data files of "A001.jpg" and "A002.jpg", the same image data (i.e., each of "A001.jpg" and "A002.jpg") is written to each of the external memory devices respectively connected to the connection slots 14A-14C.

If the number of copies inputted by the user is smaller than the number of external memory devices connected to the MFP 10, the writing operation in step S20 is executed for the external memory devices, the number of which is equal to the number of copies inputted by the user. For, example, if the number of copies is two, the same image data (i.e., each of "A001.jpg" and "A002.jpg") is written to each of the external memory devices connected to the connection slots 14A and 14B, and no image data is written to the external memory device connected to the connection slot 14C.

If the number of copies inputted by the user is larger than the number of external memory devices connected to the MFP 10, the writing operation in step S20 is executed for all of the external memory devices connected to the MFP 10.

That is, in this case, the same image data is written to all of the external memory devices connected to the MFP 10.

Figure 8:
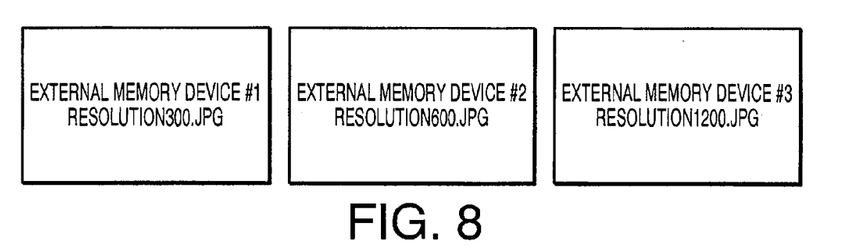
FIG. 8 is an explanatory illustration for explaining a third example of a result of the data storage process.

FIG. 8 is an explanatory illustration for explaining a result of the writing operation in step S45. More specifically, FIG. 8 shows the case where the data storage process is executed for image data obtained by the scanner 15 (e.g., "A001.jpg" stored in the RAM of the control unit 19). If the setting item "RESOLUTION SETTING" has been designated and the settings of the resolution shown in FIG. 4 have been set, three types of new data respectively having the resolution of 300 dpi, 600 dpi and 1200 dpi are created, and filenames respectively representing the resolution settings are created. More specifically, in this case, three filenames are created to have character strings "300", "600" and "1200", respectively.

Then, in step S45, the three types of new data are respectively stored in the external memory devices connected to the connection slots 14A-14C. As shown in FIG. 8, the new data having the filename of "resolution300.jpg" (i.e., image data having a resolution of 300 dpi) is stored in the external memory device connected to the connection slot 14A, the new data having the filename of "resolution600.jpg" (i.e., image data having a resolution of 600 dpi) is stored in the external memory device connected to the connection slot 14B, and the new data having the filename of "resolution1200.jpg" (i.e., image data having a resolution of 1200 dpi) is stored in the external memory device connected to the connection slot 14C.

In step S45, if the number of external memories in which the new data is to be stored is four or more, the created plurality of types of new data may be written to the external memories through the connection slots in order of slot #1→#2→#3→#1 . . . . On the other hand, if the number of external memories in which the new data is to be stored is two, the created plurality of types of new data may be written to the external memories through the connection slots in order of slot #1→#2.

Figure 9:
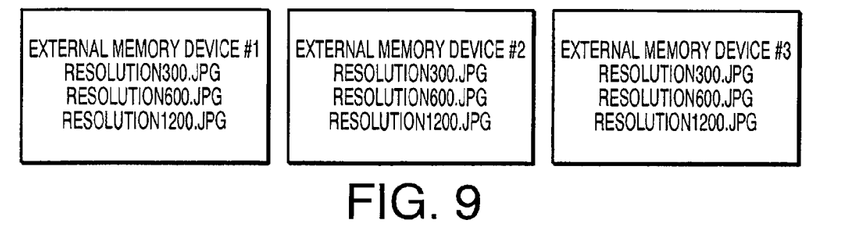
FIG. 9 is an explanatory illustration for explaining a fourth example of a result of the data storage process.

FIG. 9 is an explanatory illustration for explaining a result of the writing operation in step S40. More specifically, FIG. 9 shows the case where the data storage process is executed for image data obtained by the scanner 15 (e.g., "A001.jpg" stored in the RAM of the control unit 19), the setting item "RESOLUTION SETTING" has been set and the settings of the resolution shown in FIG. 4 have been set. If the number of copies is three and three external memory devices are connected to all of the connection slots 14A-14C, the same new data (i.e., "resolution300.jpg", "resolution600.jpg" and "resolution300.jpg") is written to each of the external memory devices 14A-14C.

If the number of copies is smaller than the number of external memory devices connected to the MFP 10, the writing operation in step S40 is executed for the external memory devices, the number of which is equal to the number of copies.

If the number of copies is larger than the number of external memory devices connected to the MFP 10, the writing operation in step S40 is executed for all of the external memory devices connected to the connection slots 14A-14C.

Figure 10:
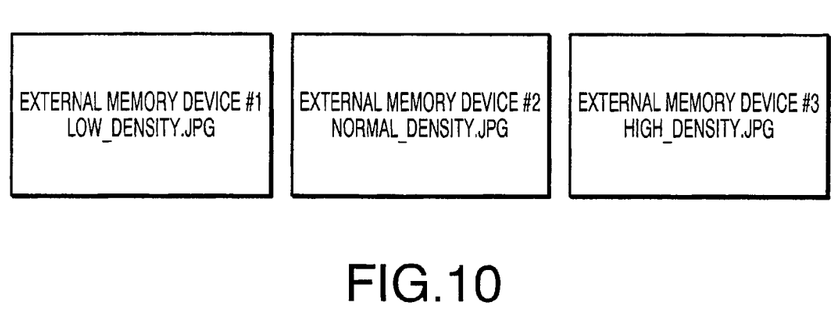
FIG. 10 is an explanatory illustration for explaining a fifth example of a result of the data storage process.

FIG. 10 is an explanatory illustration for explaining a result of the writing operation in step S45. More specifically, FIG. 10 shows the case where the data storage process is executed for image data obtained by the scanner 15 and the "RESOLUTION SETTING" is set by the user. In this example, three types of new data ("HIGH_DENSITY.JPG", "NORMAL_DENSITY.JPG" and "LOW_DENSITY.JPG") are created by using character strings representing the respective density settings.

To the new data created as described above, supplemental information concerning the settings is added. Therefore, the user is able to view the settings defined when the new data is created, on a computer on which Windows® is running, by displaying "Property" of the new data. In general, the term "Property" represents data corresponding to an attribute of an object used by an environment of object-oriented programming. That is, the "Property" is retained by an object used by in an environment of object-oriented programming. For example, regarding an image data object, data including the height and width of an image is retained as a property.

In this embodiment, once the user inputs the writing command to the MFP 10, the MFP 10 executes the writing operation for a plurality of external memory devices. Such a configuration eliminates the need for repeatedly inputting the writing command a number of times equal to the number of external memory devices. Such a configuration also enhances usability of the MFP 10 in regard to the writing operation.

As described above, once the user inputs the writing command to the MFP 10, the MFP 10 writes new data to a plurality of external memory devices. Therefore, usability of the MFP 10 is enhanced in regard to the writing operation.

In this embodiment, if a plurality of types of new data (e.g., three types of new data) are created, the plurality of types of new data are respectively written to the external memory devices or the plurality types of new data are written to each of the external memory devices. Such a configuration also enhances usability of the MFP 10 in regard to the writing operation.

In this embodiment, settings used to create new data can be set with respect to each of the external memory devices 31-33 respectively connected to the connection slots 14A-14C. Such a configuration also enhances the usability of the MFP 10 in regard to the writing operation.

In this embodiment, the new data is created such that the new data has a filename representing the settings assigned to the new data. Such a configuration enables the user to recognize the type of the new data by checking the filename of the new data.

Although the present invention has been described in considerable detail with reference to certain preferred embodiments thereof, other embodiments are possible.

In the above described embodiment, image data read by the scanner 15 is treated as a target for the data storage process on the MFP 10. However, various types of data may be treated as a target for the data storage process on the MFP 10. For example, the MFP 10 may be configured to treat print data transmitted from an external computer connected to the MFP 10. A print file for direct printing may be treated as a target for the data storage process on the MFP 10.

It is understood that the above described functions of the MFP 10 according to the embodiment may be implemented on a various types of data writing devices.

Various types of variations of the data storage process shown in FIG. 5 can be achieved. For example, regarding the case where new data is created from original data and the MFP 10 has two external memory devices as targets for the writing operation, the MFP 10 may create two pieces of new data from the original data and may write the two pieces of new data to the two external memory devices, respectively, or the MFP 10 may create a single piece of new data from the original data and may write the new data and the original data to each of the two external memory devices.

Regarding the case where the same new data is to be written to external memory devices, the MFP 10 may write a copy of the original data to each of the external memory devices.

Regarding the case where the MFP 10 creates two pieces of new data having resolutions of 300 dpi and 400 dpi from original data having the resolution of 200 dpi and the same new data is to be written to external memory devices, the MFP 10 may write the original data having the resolution of 200 dpi, the two pieces of new data having the resolutions of 300 dpi and 400 dpi to each of the external memory devices.

In the above described embodiment, the MFP 10 creates new data to have a filename including a character string representing the settings assigned to the new data. In other words, the filename of the new data represents a condition in which the new data is created. Such a configuration makes it possible to provide an overview of the new data for the user. That is, the user is able to know a property of the new data from the filename of the new data.

In order to enable the user to recognize a property of the new data, the MFP 10 may add file information (e.g., a character string representing a condition in which the new data is created) to the new data.

If the MFP 10 has a function (hereafter, referred to as a scan-to-write function) of consecutively executing the reading operation of reading a document through the scanner 15 and the writing operation of writing the image data read by the scanner 15 to the external memory device 30, the MFP 10 may create various type of setting screens for setting up the scan-to-write function such that the menu screen shown in FIG. 2 or FIG. 3 is included in each of such setting screens. In this case, when the MFP 10 receives a command for starting the scan-to-write function inputted by the user through the operation panel 12, the MFP 10 may execute the reading operation, the data storage process and the writing operation as a sequence of process.

In the above described embodiment, the MFP 10 is configured to allow the user to set one of the three types of setting items of "DENSITY SETTING", "COLOR SETTING" and "RESOLUTION SETTING". However, the MFP 10 may be configured to allow the user to set two or more of the setting items of "DENSITY SETTING", "COLOR SETTING" and "RESOLUTION SETTING" at the same time. For example, the detail settings may be made such that the monochrome color and r and the resolution of 300 dpi are assigned to the connection slot 14A, the full color and the resolution of 600 dpi are assigned to the connection slot 14B, and the color setting of cyan and black and the resolution of 1200 dpi are assigned to the connection slot 14C.

What is claimed is:

1. A data writing device, comprising:
   a plurality of connection slots to which a plurality of external storage devices are detachably attachable;
   an acceptance unit configured to accept a writing command inputted to the data writing device through a user operation and to accept a user specification of a number of copies associated with the writing command;
   a processor; and
   memory storing computer readable instructions that, when executed, cause the data writing device to:
      determine whether one or more of the plurality of connection slots has been set with a slot-specific setting condition different from the number of copies;
      write data to a plurality of external storage devices attached to the plurality of connection slots in accordance with the specified number of copies and in response to acceptance of the writing command by the acceptance unit,
   wherein the specified number of copies is interpreted to control writing of the data in a first manner upon determining that one or more of the plurality of connection slots has been set with the slot-specific setting condition, and
   wherein the specified number of copies is interpreted to control writing of the data in a second manner, different from the first manner, upon determining none of the plurality of connection slots has been set with the slot-specific setting condition.

2. The data writing device according to claim 1,
   wherein the computer readable instructions, when executed, further cause the data writing device to:
   create new data from original data in accordance with a predetermined setting condition, and
   write the created new data to one or more of the plurality of external storage devices attached to the plurality of connection slots.

3. The data writing device according to claim 2, wherein the computer readable instructions, when executed, further cause the data writing device to write the created new data to each of a number of the plurality of external storage devices attached to the plurality of connection slots when none of the plurality of connection slots has been set with the slot-specific setting condition, wherein the number of the plurality of external storage devices corresponds to the specified number of copies.

4. The data writing device according to claim 2, wherein the new data is created with a filename including a character string representing at least partly the predetermined setting condition defined to create the new data.

5. The data writing device according to claim 1,
   wherein the computer readable instructions, when executed, further cause the data writing device to individually set the slot-specific setting condition for each of the plurality of external storage devices attached to the plurality of connection slots.

6. The data writing device according to claim 5, wherein the slot-specific setting condition includes at least one of density, resolution and color used for one of printing and onscreen representation.

7. The data writing device according to claim 5,
   wherein:
   when one or more of the plurality of connection slots has been set with the slot-specific setting condition and if the number of copies has been set to one, the data writing device is configured to write a plurality of types of new data in accordance with a plurality of types of slot-specific setting conditions respectively set for the plurality of external storage devices, to the plurality of external storage devices attached to the plurality of connection slots, respectively.

8. The data writing device according to claim 5,
   wherein:
   when one or more of the plurality of connection slots has been set with the slot-specific setting condition and if the number of copies is set to a value larger than or equal to two, the data writing device is caused to write the created new data to each of a number of the plurality of external storage devices attached to the plurality of connection slots, wherein the number of the plurality of external storage devices corresponds to the specified number of copies.

9. The data writing device according to claim 1,
   further comprising a reading unit configured to read data from a document,
   wherein the data writing device is caused to write the data read by the reading unit to the plurality of external storage devices attached to the plurality of connection slots.

10. The computer readable medium according to claim 1, further storing instructions that, when executed, cause the data writing device to allow a user to individually set the slot-specific setting condition for each of the plurality of external storage devices attached to the plurality of connection slots.

11. A non-transitory computer readable medium having computer readable instructions stored thereon, which, when executed, cause a data writing device to:
   receive a user specification of a number of copies for a data writing function of the data writing device;
   accept a writing command associated with the data writing function and inputted to the data writing device through a user operation;
   determine whether one or more of a plurality of connection slots of the data writing device has been set with a slot-specific setting condition different from the number of copies; and
   write data to a plurality of external storage devices attached to the plurality of connection slots in accordance with the specified number of copies and in response to acceptance of the writing command by the acceptance unit,
   wherein the specified number of copies is interpreted to control writing of the data in a first manner upon determining that one or more of the plurality of connection slots has been set with the slot-specific setting condition, and
   wherein the specified number of copies is interpreted to control writing of the data in a second manner, different from the first manner, upon determining none of the plurality of connection slots has been set with the slot-specific setting condition.

12. The computer readable medium according to claim 11, further storing instructions that, when executed, cause the data writing device to create new data from original data in accordance with a predetermined setting condition, wherein the created new data is written to one or more of the plurality of external storage devices attached to the plurality of connection slots.

13. The computer readable medium according to claim 12, wherein the created new data is written to a number of the plurality of external storage devices attached to the plurality of connection slots when none of the plurality of connection slots has been set with the slot-specific setting condition, wherein the number of the plurality of external storage devices corresponds to the specified number of copies.

14. A method comprising:
   receiving a user specification of a number of copies for a data writing function of a data writing device;
   accepting a writing command inputted associated with the data writing function to the data writing device through a user operation;
   determine whether one or more of a plurality of connection slots of the data writing device has been set with a slot-specific setting condition different from the number of copies; and
   writing data to a plurality of external storage devices attached to the plurality of connection slots in accordance with the specified number of copies and in response to acceptance of the writing command by the acceptance unit,
   wherein the specified number of copies is interpreted to control writing of the data in a first manner upon determining that one or more of the plurality of connection slots has been set with the slot-specific setting condition, and
   wherein the specified number of copies is interpreted to control writing of the data in a second manner, different from the first manner, upon determining none of the plurality of connection slots has been set with the slot-specific setting condition.

15. The method according to claim 14,
   further comprising the step of creating new data from original data in accordance with a predetermined setting condition,
   wherein, in the step of writing, the created new data is written to one or more of the plurality of external storage devices attached to the plurality of connection slots.

16. The method according to claim 15, wherein the created new data is written to each of a number of the plurality of external storage devices attached to the plurality of connection slots when none of the plurality of connection slots has been set with the slot-specific setting condition, wherein the number of the plurality of external storage devices corresponds to the specified number of copies.

17. The method according to claim 15,
   further comprising the step of allowing a user to individually set the slot-specific setting condition for each of the plurality of external storage devices attached to the plurality of connection slots.

* * * * *